S. VANSTONE.
Making Car Wheels.
No. 65,454.
Patented June 4, 1867.
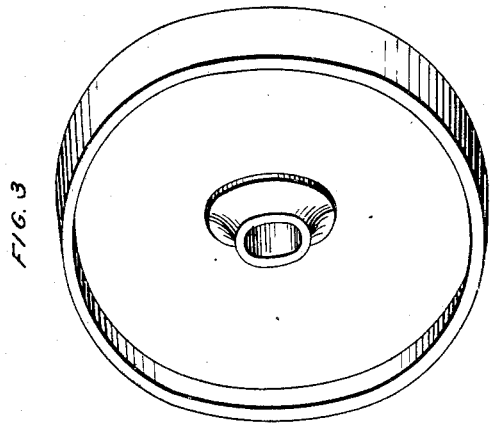
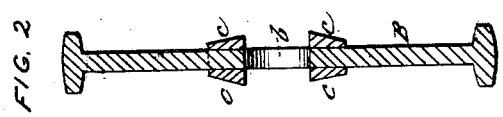
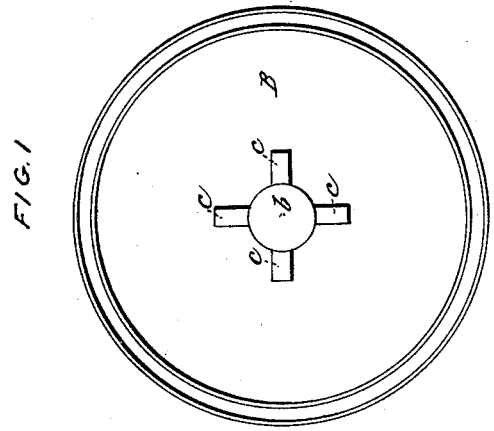

United States Patent Office.

SAMUEL VANSTONE, OF PROVIDENCE, RHODE ISLAND, ASSIGNOR TO HIMSELF AND JOHN STEWART, OF SAME PLACE.

*Letters Patent No. 65,454, dated June 4, 1867.*

IMPROVEMENT IN MAKING CAR-WHEELS.

*The Schedule referred to in these Letters Patent and making part of the same.*

TO ALL WHOM IT MAY CONCERN:

Be it known that I, SAMUEL VANSTONE, of Providence, in the county of Providence, and State of Rhode Island, have invented a new and useful Improvement in Metal Wheels for Railroad Cars and other Vehicles; and I do hereby declare that the following is a full, clear, and exact description thereof, which will enable others skilled in the art to make and use the same, reference being had to the accompanying drawings, forming part of this specification, in which—

Figure 1 is a side or face view of a wheel constructed according to my invention.

Figure 2, a section of fig. 1, taken in the line $x\ x$.

Figure 3 is a perspective view of the finished wheel and hub.

Similar letters of reference indicate like parts.

This invention relates to an improved metallic forged or struck-up wheel, and it consists in making the hub separately from the wheel, and providing the centre hole with lips or projections at its edges, as will be hereinafter more fully explained.

Figs. 1 and 2 represent a wheel, B, in which the hub is made separately from it, the wheel after being forged having its hub cast in it; said wheel B being formed with a central hole, $b$, having lips or projections, $c$, at its edges, extending out from each side of the wheel to prevent the hub from slipping. Fig. 3 represents the hub finished or cast upon the lugs around the central hole.

The object of the invention is to supersede the ordinary cast-iron wheels, by being stronger and lighter and far more durable, whether used for car-wheels or other vehicles, or as drivers for locomotives. The forging of the wheel renders the metal compact and extremely tough.

Having thus described my invention, I claim as new, and desire to secure by Letters Patent—

Constructing a car-wheel by first forging or stamping the part B with the lugs C around the centre hole $b$, and then casting the hub thereon, substantially as described.

SAMUEL VANSTONE.

Witnesses:
JAMES G. MARKLAND,
J. E. WARREN.